United States Patent Office.

AUGUST EIKERENKOTTER AND FRANK SILVER, OF SEARSVILLE, CALIFORNIA.

Letters Patent No. 68,422, dated September 3, 1867.

IMPROVED MODE OF PRESERVING COFFEE.

*The Schedule referred to in these Letters Patent and making part of the same.*

TO ALL WHOM IT MAY CONCERN:

Be it known that we, AUGUST EIKERENKOTTER and FRANK SILVER, of Searsville, San Mateo county, State of California, have invented or discovered a new and improved Process for Preserving Coffee; and we do hereby declare the following to be a full and exact description of the same, and the manner in which the mixing and compounding and using is to be performed.

The nature of our process is to preserve coffee in its natural strength and flavor, without deterioration in whatever climate, or however long it may be kept before using it.

For accomplishing our object we take coffee of the desired quality, and burn it brown in the ordinary way. We then grind it to an impalpable powder, or as fine as flour. We now prepare good brown sugar, or any other kind, which should be very dry, which can be accomplished by placing on a heater or in the sun, by burning it to a brown color, as dark as that of the coffee after it is burned. We then place it in a boiler over a fire until it is melted, and then stir in the same amount of the ground coffee above described, by measure, as that of the sugar. Care should be taken to have the whole mass well mixed; and when this is accomplished it may be taken out of the vessel, and formed into cakes for use. It is recommended not to keep the mixture too long upon the fire, as much of the aroma might escape.

For using, a piece of the desired size is broken off and placed in a vessel of cold water; and when the water has risen to a boiling point the coffee so prepared is ready for use. By this means we obtain coffee that will keep in any climate, retaining the original strength and flavor; and a much less quantity will be found necessary to supply the wants of a given number of persons than where it has not been so prepared before using it. Also, the compact form in which it is put up, being about the size and form of chocolate, will be found to be very convenient for transportation to remote places.

Having thus described our invention or discovery, what we claim, and desire to secure by Letters Patent, is—

The process herein described for preserving coffee.

We also claim the product as herein described as a new article of manufacture.

In witness whereof we have hereunto set our hands and seals.

AUGUST EIKERENKOTTER. [L. S.]
               his
           FRANK × SILVER. [L. S.]
              mark.

Witnesses:
 C. L. MAHLKE,
 WILSON WHITLOCK.